Nov. 17, 1964   C. KENDZIORSKI, JR., ETAL   3,157,787
LIGHTWEIGHT RIGID RADIOGRAPHIC FILM CASSETTE
Filed Sept. 5, 1962

*INVENTOR.*
CASIMIR KENDZIORSKI JR.
BY RICHARD E. HORA
*Ralph D. Hohenfeldt*
ATTORNEY

3,157,787
LIGHTWEIGHT RIGID RADIOGRAPHIC FILM CASSETTE

Casimir Kendziorski, Jr., and Richard E. Hora, Milwaukee, Wis., assignors to General Electric Company, a corporation of New York
Filed Sept. 5, 1962, Ser. No. 221,492
9 Claims. (Cl. 250—68)

This invention relates to a cassette for holding a film while taking pictures with X-ray or other penetrating radiation.

X-ray cassettes comprise a frame and X-ray permeable front panel which together define a rectangular cavity for receiving an X-ray film substantially coplanar with the front. A sealed cover that is hinged to the frame is provided for securing the film and making the cavity lighttight. The cover usually carries a resilient mat whose purpose is to compress the film in uniform contact relation with the front panel when the cover is closed. It is common to use fluorescent intensifier screens on one or both sides of the film, in which case it is desirable for the film, screen or screens and front panel to be compressed uniformly without any air pockets between them. An air pocket as thin as 0.001 inch will cause spurious image shadow gradations or unevenly exposed areas to appear on the film. This may result in deceiving the diagnosing radiologist when he examines the radiograph.

One of the principal problems associated with known types of X-ray cassettes is that they have a propensity for warping and twisting in manufacture or use. This is caused primarily by internal stresses which are difficult to relieve from the cassette frame and its X-ray permeable front panel. A warped cassette prohibits getting uniform pressure on the film. If warping is very great, the cassette will not be accepted easily by its cassette holder in X-ray equipment.

The cassette front, through which X-radiation penetrates in the course of making a radiograph has been heretofore out of a single sheet of metal or phenol formaldehyde resin, otherwise known by the trademark Bakelite. The resin is used because of its relatively low density and good permeability to X-rays. A ⅛ inch thick panel of this material has the X-ray equivalent filtration of only 0.0025 inch of aluminum. It has a serious disadvantage, however, in that in due course it tends to permanently warp, either due to its hygroscopic character, or to stress, or both. This makes good film contact impossible and renders the cassette worthless. Attempts to avoid moisture absorption have involved molding metallic moisture barrier layers near the surface of the material or coating it with a non-hygroscopic material, but neither of these solutions has been totally successful.

Another compromise solution has been to make the cassette with a heavier frame and to employ a thick front panel of aluminum, magnesium or other lightweight material. This approach has limitations, however, because the over-all cassette thickness cannot exceed an established standard, and as the front thickness is increased, X-ray permeability decreases. Hence, more exposure of the patient to X-radiation is necessary to obtain an equivalent radiograph. Even the use of a heavy metal front panel does not wholly remedy the distortion problem nor does it result in a cassette that is as inflexible as one might expect.

An object of the present invention is to provide a radiographic film cassette whose front panel is especially permeable to X-rays and which cassette is rigid, warp-proof, lightweight and easily and inexpensively manufactured.

More specific objects of the inventioin are: to provide a cassette whose frame is fabricated by securing it with synthetic resin adhesives; and, to provide the cassette with a front panel that is especially rigid, lightweight, and X-ray permeable and which comprises a sandwich construction that is formed by bonding two thin, strong facing sheets to a comparatively thicker, lightweight core that separates and stabilizes the thin facings, thus giving them much greater stiffness.

Achievement of these and other more specific objects will appear from time to time throughout the course of the ensuing specification.

In general terms, the new cassette is characterized by a metal frame whose length and width are made up of hollow formed sheet metal members that are joined at their ends by corner piece inserts which extend into the frame pieces and are secured with an epoxy or other synthetic resin rather than having the corners welded or riveted as under prior practice. The insides of each frame member are formed with a slot that is coextensive with their lengths. The slot so formed around the inside perimeter of the cassette is adapted to receive of the X-ray transmissive front panel which is also secured by synthetic resin.

A unique front panel construction is employed. An illustrative embodiment comprises a sheet of urethane or other rigid foam or cellular material whose opposite parallel plane surfaces have adhered to them sheets of low density metal such as aluminum or other rigid sheet material. Because the sheets are spaced from each other by the rigid foam, the front panel has nearly the bending resistance of a solid beam of equal thickness. Moreover, the panel remains flat because it is not affected by moisture nor are there any residual stresses that might cause warping.

A more detailed description of the invention will now be set forth in connection with the drawing in which.

Figure 1:
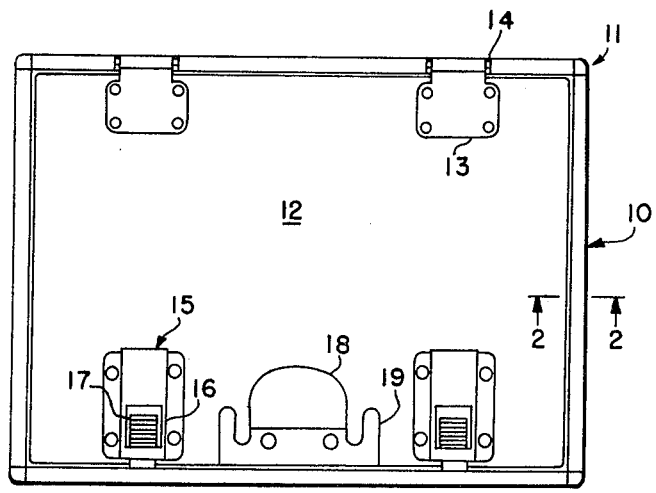
FIG. 1 is a plan view of the backside of an X-ray cassette employing the invention.
Figure 2:
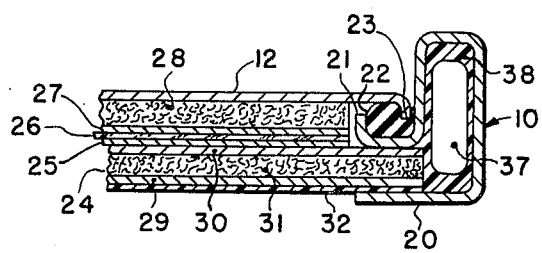
FIG. 2 is a partial section taken on a line corresponding with 2—2 in FIG. 1.

In FIG. 1 it may be seen that the new cassette has some of the basic features of known types. It comprises a frame 10 which may be hollow as seen in FIG. 2 and joined together with corner pieces 11 to define a film holding cavity which is enclosed by a cover 12. Cover 12 may be joined to frame 10 with hinges 13 in any one of several conventional ways, but in this instance the hinges are riveted to cover 12 after T-shaped ends thereof are inserted in appropriate slots 14 in the frame. Cover 12 is adapted to swing open on hinges 13 for the purpose of inserting or removing an X-ray film. It is desirable that cover 12, when viewed from the top, exhibits a slight concavity so that it is inwardly convex. This inward convexity aids in securing good contact relation between cover 12 and X-ray film within the cassette when the cover is closed. In other words, the cover first makes tangential contact in proximity with the center of the cassette so as to exclude air that might be trapped on the face of the film when the cover flattens as it is latched.

Cover 12 is held closely with respect to frame 10 through the agency of a pair of latches 15. The latches may be of any conventional design but they are here shown as comprising a guide member 16 having an opening on its top through which may be engaged a bolt 17. The user may slide the bolts back with his thumbs in opposition to concealed springs which tend to urge the bolts into a slot, not shown, on the inside of frame 10. Because of the slight spherical bowing of cover 12, it is inclined to open slightly when latches 15 are released. The user may then swing the cover open completely by grasping a tab 18 of any flexible material like leather.

Tab 18 may be clamped to the cover with a strap 19 and rivets or other fasteners.

In FIG. 2, the cross-sectional configuration of the frame members 10 that form the perimeter of the cassette is clearly evident. The frame members 10 may be of stainless steel about 1/32 inch thick and they are generally hollow and are formed with a bottom flange 20 and a U-shaped flange 21 in which resides a rubber gasket 22 that forms a light-tight seal with a down turned edge 23 of the cover. Thus, it is seen that a slot is defined between lower flange 20 and upper flange 21 which is adapted to receive the edge of a laminated front panel 24. The way front panel 24 is fabricated and the manner in which it is joined with frame members 10 will be described in greater detail shortly hereinafter.

It will be seen that the X-ray permeable front panel 24 constitutes the bottom of the cassette through which the image bearing X-rays penetrate. Usually, as in this case, there is provided an X-ray image intensifier screen 25 which is permanently adhered to the front panel 24 inside the cassette. Immediately on top of the intensifier screen 25 is the radiographic film 26 on which there may be superposed another intensifier screen 27. The latter screen is usually adhered to a resilient material such as a glass fiber mat 28 that is adhered in turn to the inside of cover 12. Thus, it is seen that upon opening of cover 12, mat 28 and intensifier screen 27 will be carried with it in order that X-ray sensitive film 26 may be deposited or removed in a darkroom.

One of the unique features of the cassette is the front panel 24 construction. It is important that front panel 24 be highly permeable to X-rays so that an image may be recorded on film 26 without having to expose the patient to an unnecessarily high dose of radiation. One way of attaining this objective has been to make cassette front panels out of metals like aluminum or magnesium which attenuate X-rays very little because of their low atomic numbers. A solid metal panel has disadvantages, however, because in order to impart requisite stiffness to the cassette it must be rather thick. This results in excessive attenuation of the X-radiation. Another alternative that is commonly employed is to make the front panel out of a sheet of phenolic resin or other inorganic material which, by reason of it containing only low atomic number elements, attenuates X-radiation very little. However, known organic sheet materials are inclined to swell and warp because they are somewhat hygroscopic and temperature sensitive. This results in the film 26 not laying perfectly flat and in the development of air pockets which cause a defective radiograph. Moreover, plastic materials ordinarily have little resistance to bending forces so they do not contribute appreciably toward rigidifying the cassette.

The new cassette front 24 is suprisingly stiff and has a good X-ray permeability. It comprises a unitary assembly of a lower aluminum sheet 29 about 0.03125 inch thick and an upper aluminum plate 30 which may be 0.012 inch thick. These sheets of aluminum, magnesium, and their alloys or other low atomic number element are bonded to a light weight cellular or foamed material 31 such as urethane, polystyrene, phenolic, urea formaldehyde, silicone resin, cellular cellulose acetate or other rigid foam. Moisture proofed balsa wood and other natural cellural products of acceptably low density and uniformity may also be used. In place of metal sheets 29 and 30, rigid laminated plastic sheets may be substituted. The density of the foam material 31 is so low that its X-ray absorption is immeasurable with available devices and is inconsequential. Thus, the thickness of foam layer 31 is governed almost entirely by the strength requirements for panel 24. Commercial embodiments of the invention have used urethane or polystyrene foams having densities ranging between twenty and forty pounds per cubic foot. This compares with Bakelite whose density is usually slightly in excess of eighty pounds per cubic foot. It has been found that even at the upper limit, density of the rigid foam is not so great as to measurably affect X-ray permeability.

Requisite rigidity of front panel 24 may be obtained with metal sheets 29 and 30 whose thicknesses are indicated above and with a rigid foam layer 31 having a thickness in the vicinity of 1/8 inch or 5/32 inch. One may want to use a thicker foam layer 31 for larger cassettes like the standard 14 x 17 inch size and a thinner layer for a nominal 5 x 7 inch cassette. Any foam thickness that does not result in exceeding the permissible height of the X-ray cassette may be used without affecting X-ray permeability appreciably.

Those versed in the art of structural design will appreciate that front panel 24 constructed as described above will be substantially as stiff as if the panel were of solid metal rather than laminated. This is so because it is the outside layers of a beam that are subjected to the greatest tensile and compressive stresses when it is loaded transversely. These stresse vary according to their distances from the neutral axis of the beam at which the stress is substantially zero. The new front panel 24 applies the load bearing metal sheets 29 and 30 on opposite faces of the foam material 31 where the stress is the greatest and uses the low strength foam material in the region where there is little or no stress. Stated in another way, the stiffness of the front panel, as in the case of a beam, is proportional to the moment of inertia of the panel cross section and the modulus of elasticity of its laminae, and is inversely proportional to the cube of its length. A high moment of inertia produces high strength or resistance to bending and this is brought about by separating metal sheets 29 and 30 the greatest permissible distance from the neutral axis of panel 24 lying somewhere within the foam material 31.

In spite of the fact that the cassette front is bounded by comparatively thin metal layers 29 and 30, the cassette is particularly immune to the effects of denting the front panel accidentally. That is, the deformation that results from denting front panel sheet 29 is absorbed by the foam material and not transmitted to the interior of the cassette. This means that an accidental denting of the cassette when it is loaded with a film 26 will not form an air pocket under the film or adversely affect its contact. Thus, the new cassette front can tolerate reasonable dents without destroying its usefulness for taking radiographs. It will be observed that the outside metal sheet 29 is made slightly thicker than the inside sheet 30 in order to minimize the danger of denting although the backing of rigid foam 31 makes a significant contribution toward avoiding this result.

For aesthetic reasons, it may be desirable to coat the outside layer 29 of front panel 24 with a vinyl material constituting a thin layer 32 that is bonded to metal sheet 29 by any suitable adhesive before panel 24 is fabricated. The aluminum sheet laminated with vinyl is readily obtainable commercially.

The laminated X-ray permeable front panel 24 may be fabricated in a number of different ways. One method is to prepare a rigid sheet of the foam material 31 and to bond metal or rigid sheets 29 and 30 of other material to its faces by using a thin coating of epoxy or other synthetic adhesive at the interfaces. After applying the adhesive, the front panel 24 may be pressed until the adhesive cures. As is known, curing time depends on temperature but a curing at 175° F. for six minutes has been found expedient.

A method used in practice to produce a good quality front panel 24 involves a molding form, not shown, which contains a rectangular cavity of length and width approximately the same as the dimensions of the panel. The bottom metal sheet 29 is placed in the bottom of the mold cavity and the ingredients of the rigid foam mixture 31 are poured over sheet 29 in a quantity appropriate to fill the cavity when the foam material is expanded. Immediately thereafter, top metal sheet 30 is placed over the region occupied by the foam and a reaction ensues which results in expansion of the foam to the interfaces of sheets 29 and 30. Of course, the top sheet 30 must be held down with a pressure plate so that the desired foam density will be obtained without lifting top sheet 30. By this method, adhesion of the foamed polystyrene, urethane or other plastic material is so good with the interfaces of sheets 29 and 30 that application of any other adhesive is unnecessary.

The art of preparing the foamed material 31 is well known but it may be briefly stated that it involves mixing a urethane liquid resin, for example, with a urethane resin activator or foaming agent and quickly pouring the mixture on bottom sheet 29. The mixture sets in about 30 seconds to a rigid foamed material which adheres to metal sheets 29 and 30 as explained above.

A commercial embodiment of the invention uses aluminum sheets 29 and 30 whose aggregate thickness is about 0.043 inch. This has the absorption equivalent of about one millimeter of aluminum, and those versed in the art will appreciate that this is very low absorption considering the stiffness and lightness of front metal 24.

Another unique feature of the new cassette is the assembly of front panel 24 and frame members 10 without resorting to riveting or welding as is customary. Rather, the edge of the laminated panel 24 is received within the slot created by parallel plane surfaces on inwardly extending flanges 20 and 21 that project integrally from frame member 10. Before assembling the frame members 10 to the edge of panel 24, a thin bead of epoxy or other resin is placed on the outside surfaces of the sheet metal faces 29 and 30 to effect adhesion with flanges 20 and 21. After curing for a period that depends on temperature the frame members 10 become integrally bonded with the front panel 24 and an especially rigid cassette construction results.

To assemble the cassette frame, three members 10 are joined together with corner pieces 11 to form an open-sided rectangle. Front panel 24 is then inserted in the slot between flanges 20 and 21 after an adhesive resin is placed on the front panel or on the flanges. The rectangle is then closed by the remaining or fourth side constituting frame 10 by the same technique of using adhesive resin and curing.

Figure 4:
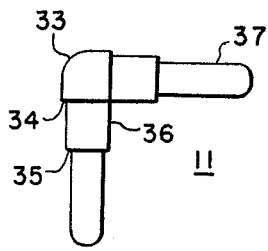
FIGS. 3 and 4 are end and plan views of parts that are suitable for joining the frame of the new cassette at its corners.
Figure 3:
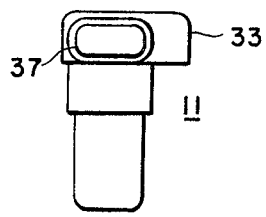

The corner pieces 11, used for joining the frame members 10 together, are shown in greater detail in FIGS. 3 and 4. Each includes an arcuate corner 33 that is reduced in width in steps to create shoulders 34 and 35 that define reduced extensions 36 and 37. The extensions are adapted to project inside of the ends of frame members 10 as is evident in FIG. 2 where one of the extensions 37 can be seen at the end of a cross section of frame member 10. Before assembly in the frame members, extensions 36 and 37 are coated with an epoxy resin adhesive, preferably. The adhesive sets a short time after the corner piece 33 is inserted in frame member 10 so that a rigid cassette frame results. As explained above, during the cassette assembly operation, three frame members 10 are joined with two corner pieces 11 to form an open-sided rectangle and the fourth frame member has the corner pieces bonded in its ends so that projections 36 and 37 of the corner pieces can be pushed into the open ends of opposite parallel frame members to complete the assembly. The confined epoxy resin is indicated by the numeral 38 in FIG. 2 where in reality it is about 1/32 inch thick.

In summary, there has been described an X-ray cassette that has high strength and light weight and is joined together at its corners with an adhesive material to form an effectively unitary construction. There has also been described the fabrication of a new laminated cassette front which is especially stiff and highly permeable to X-rays.

In addition, it is evident that the new cassette frame may be made without any residual stresses because it may be assembled when the adhesive on the corner pieces is pliable enough to allow self alignment of the frame members when they are clamped between parallel planes during the assembly operation.

Although a preferred embodiment of the invention has been described, such description should be considered illustrative rather than limiting, for the invention may be variously embodied and is to be construed in accordance with the scope of the claims that follow.

It is claimed:

1. A radiographic film cassette comprising frame means, a cover hinged to the frame means for closing one side thereof, a radiation permeable front panel that is fastened about its perimeter to the frame means, said front panel comprising parallel spaced sheets and a lightweight rigid cellular core material occupying the space between the sheets and adhered thereto.

2. The invention set forth in claim 1 wherein said core material is selected from the group consisting of urethane and polystyrene rigid foams.

3. The invention set forth in claim 1 wherein said core material is selected from the group consisting of foamed plastic: urea formaldehyde, epoxy, silicone resin and cellular cellulose acetate.

4. A radiographic film cassette comprising elongate members that are joined right angularly at their ends to form a frame means, a pair of spaced parallel flanges projecting from the frame means toward its interior to define a perimetral slot, a radiation permeable cassette front panel whose edges are received in said slot, said front panel comprising parallel spaced rigid sheets and a core of rigid foam material occupying the space between the sheets and adhered thereto, and a cover for closing the side of the frame that is opposite from the front panel.

5. The invention set forth in claim 4 wherein the edges of the front panel are secured between said flanges with a synthetic resin adhesive.

6. The invention set forth in claim 4 wherein the edges of said front panel are secured between said flanges with an epoxy resin adhesive.

7. A front panel for a radiographic cassette comprising a pair of plane rigid sheets spaced in parallelism with each other, a core of rigid cellular material occupying the space between the sheets and adhered thereto.

8. The invention set forth in claim 7 wherein the cellular material is a rigid foam selected from the group consisting of urethane and polystyrene.

9. A radiographic cassette comprising hollow frame members with endwise openings, a corner element connecting right angularly adjoining frame members, the corner element having mutually perpendicular extensions that project into the ends of adjoining frame members, a coating of adhesive material interposed between the frame members and extensions for securing the latter in the frame members, said frame members also having a slot opening on their sides which are presented to the interior of the frame, a radiation permeable front panel whose edges are received in said slot, said front panel comprising spaced parallel metal sheets and a core of rigid foam material occupying the space between the sheets and adhered thereto, and a cover for closing the side of the frame that is opposite from the front panel.

References Cited in the file of this patent

UNITED STATES PATENTS

| | | |
|---|---|---|
| 2,852,692 | Wagner | Sept. 16, 1958 |
| 2,878,389 | Raffman | Mar. 17, 1959 |
| 2,925,766 | Sandgren | Feb. 23, 1960 |
| 3,001,071 | Reiss | Sept. 19, 1961 |